UNITED STATES PATENT OFFICE.

ERICH BERTHOLD, OF BERLIN, GERMANY, ASSIGNOR TO ACTIEN GESELLSCHAFT FÜR ANILIN FABRIKATION, OF BERLIN, GERMANY.

MONOAZO DYE.

983,805.  Specification of Letters Patent.  Patented Feb. 7, 1911.

No Drawing.  Application filed July 18, 1910. Serial No. 572,634.

*To all whom it may concern:*

Be it known that I, ERICH BERTHOLD, a subject of the King of Prussia, residing at Berlin, Germany, my post-office address being 61 Johanniterstrasse, 1¹, Berlin, S. W., have invented certain new and useful Improvements in Monoazo Dye and Processes of Making the Same, of which the following is a specification.

I have found that by diazotizing para-aminodiphenylamin and combining the diazo compound thus formed with resorcinol a new azo coloring matter is obtained which, because of its very remarkable fastness against the action of light is very useful for several industrial purposes. For example it may be used in the manufacture of color lakes for lithography, for wall-paper printing and for alcoholic varnishes; furthermore this dyestuff is very well adapted for dyeing wood brown shades which possess a very good fastness to light. The manufacture of such lakes and the dyeing of wood is performed in the manner usual for such purposes.

The following example serves to illustrate the invention, the parts being by weight: 22 parts of the hydrochlorid of para-aminodiphenylamin are stirred together with 500 parts of water and 36 parts of hydrochloric acid of 12° Bé. specific gravity. After dissolution the mass is cooled to 0° C. and diazotization performed at this temperature by means of 7 parts of sodium nitrite. A resorcinol solution is prepared by dissolving 11 parts of resorcinol and 23 parts of caustic soda lye of a specific gravity of 40° Baumé, in about 300 parts of water and 11 parts of anhydrous sodium carbonate is added. This solution is cooled with ice and the diazo compound is poured into the same and the whole mass stirred continuously. After stirring for several hours the formation of the dyestuff is complete, whereupon the product of the reaction is salted out by adding common salt and filtered obtaining thus the sodium compound of the dye which by adding a mineral acid and a hydrochloric acid is converted into the free dyestuff, which is filtered, washed with water, pressed and dried. The new dye is thus obtained when pulverized in the shape of a greenish black powder which is insoluble in cold water and with difficulty soluble in boiling water. This aqueous solution possesses an orange coloration which coloration is not altered by adding some concentrated liquor ammoniæ or some concentrated caustic soda lye. The dye is easily soluble in alcohol which solution in a suitable concentration shows a yellow brown coloration which coloration on addition of concentrated liquor ammoniæ or of concentrated caustic soda lye turns to red orange and on addition of concentrated hydrochloric acid changes to deep blue. In concentrated sulfuric acid the coloring matter easily dissolves to a yellow brown solution which on the addition of ice shows a blue and grainy precipitate. By the action of strong reducing agents the dyestuff is split up, para-aminodiphenylamin being formed besides amino-resorcinol.

The dye produces on wood from an alcoholic solution in a suitable concentration a tint which resembles that of light oak wood. It is also adapted for the manufacture of alcoholic varnishes which varnishes show a reddish brown tint.

The present invention is not limited to the foregoing example and more especially to the special conditions of reaction.

Having now described my invention and the manner in which it may be performed what I claim is,—

As a new article of manufacture the new hereinbefore described monoazo dyestuff derived from para-aminodiphenylamin and resorcinol, which new dyestuff may be obtained by diazotizing para-aminodiphenylamin and combining the diazo compound thus obtained with resorcinol, which new dye is especially adapted to dyeing of wood and for the manufacture of alcoholic varnishes, this dye representing when pulverized a greenish black powder which is insoluble in cold water and difficultly soluble in boiling water, which aqueous solution possesses an orange coloration, which coloration is not altered by adding some concentrated liquor ammoniæ or some concentrated caustic soda-lye, and this new dye being easily soluble in alcohol which solution in a suitable concentration shows a yellow brown coloration which coloration on addition of concentrated liquor ammoniæ or of concentrated caustic soda-lye turns to red orange and on addition of concentrated hydrochloric acid changes to deep blue, this new dye easily dissolving in sulfuric acid to a yellow brown solution which on the addition of ice shows a blue and grainy precipitate, and this new dye by the action of strong reducing agents, such as for instance stannous chlorid and hydrochloric acid, being split up whereby para-aminodiphenylamin is formed besides amino-resorcinol.

In testimony whereof I have hereunto set my hand in presence of two subscribing witnesses.

ERICH BERTHOLD.

Witnesses:
 HENRY HASPER,
 WOLDEMAR HAUPT.